7235X

M. BUCKLIN.

Cylinder Pump.

Patented Oct. 25, 1832.

Figure 1:
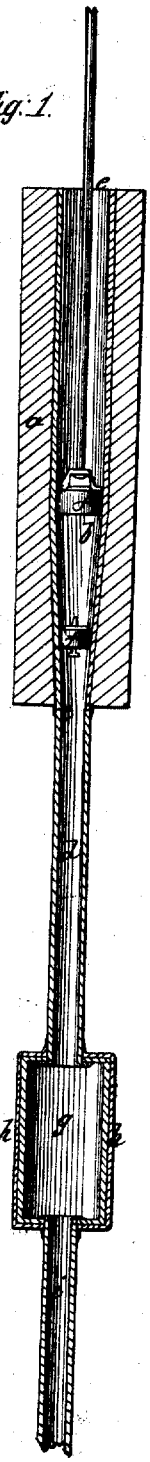
Figure 4:
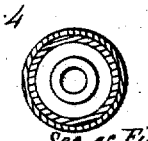
Figure 3:
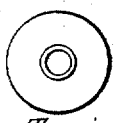
Figure 2:
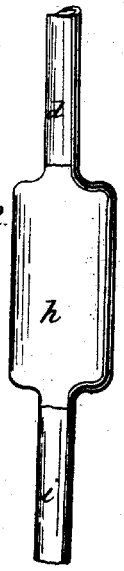
Figure 5:
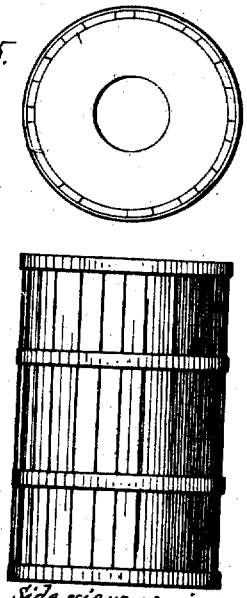

Sec. of Fig. 2.

Top view of Fig. 2.

Side view of air vessel

THE NORRIS PETERS CO., PHOTO-LITHO., WASHINGTON, D. C.

7235X Av. 14 Oct. 25 1832 238

Moses Bucklin
Letters Patent

The schedule referred to in these Letters Patent and making part of the same containing a description in the words of the said Moses Bucklin himself of his improvement in the construction of Water Pumps

---

To all to whom these presents shall come. Be it known that Moses Bucklin of Grafton in the County of Grafton & State of New Hampshire have invented a new & useful improvement in the construction of water pumps & that the following is a full & exact description of the construction & operation of the said machine as invented or improved by me viz A log or stock is prepared in the usual form of common suction pumps of length proportioned to the depth of the well. this being bored thro' & rimmed from the top nearly to the bottom is prepared for a lining or chamber to be of lead composition or other metal contracted at the bottom to the form of the rimmer used in boring the log or size of pipe intended to be used. A piece of lead pipe is then soldered to this chamber & entered at the top or upper end of the log and thro' at the bottom It is then to be brought down with a quick & smart motion which will shape it to the rimming of the log & make it tight. In this chamber or lining the boxes are placed & are in the usual form. The log or stock is now fitted for setting up which may be over the well or at a distance from it as the owner wishes. When water is to be drawn a considerable distance a great improvement consists in making a vacuum or air vessel in the pipe near the pump. This vessel I make of white oak or other suitable timber in the shape of a keg without a bilge & have a piece of pipe fixed in each end & near the side intended to go down. It is then to be covered with sheet lead perfectly tight. The pipe is joined a few feet from the pump with that in the vessel & that in the opposite end extended to the water. The said Bucklin claims as an improvement in said pump the having said chamber & the pipe soldered to it thereby preventing all liability of leaking & making said vacuum of wood & covering

7235X covering it with lace being perfectly healthy & life appearance than appear
on any other material before used or known Witnesses Saml Gill N. W. Wadgate Moses Buckelin 448 rds Ex'd Chf.